US008231051B2

(12) United States Patent
Popowski

(10) Patent No.: US 8,231,051 B2
(45) Date of Patent: Jul. 31, 2012

(54) INTEGRATED ONLINE DOOR VIA ELECTRONIC DOOR HANDLE

(75) Inventor: Paul M. Popowski, Lake Mills, WI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/575,662

(22) Filed: Oct. 8, 2009

(65) Prior Publication Data

US 2010/0026449 A1 Feb. 4, 2010

Related U.S. Application Data

(63) Continuation of application No. 11/782,557, filed on Jul. 24, 2007, now Pat. No. 7,967,197.

(51) Int. Cl.
*G06K 5/00* (2006.01)

(52) U.S. Cl. ........................................ 235/382; 235/380

(58) Field of Classification Search .................. 235/375, 235/380, 382; 340/5.1, 5.2, 5.6, 5.61, 5.64, 340/5.7; 49/61, 62, 98, 159, 279, 303, 324, 49/365, 394, 449; 292/2, 138, 251.5
See application file for complete search history.

(56) References Cited

U.S. PATENT DOCUMENTS 4,929,005 A * 5/1990 Heinen ...................... 292/251.5
5,491,471 A * 2/1996 Stobbe ......................... 340/5.61
5,608,298 A * 3/1997 Frolov et al. .................. 318/286
5,936,544 A * 8/1999 Gonzales et al. ............ 340/5.22
6,259,352 B1 * 7/2001 Yulkowski et al. ............ 340/5.7
6,486,793 B1 * 11/2002 Buccola ......................... 340/5.2
6,496,101 B1 * 12/2002 Stillwagon ................... 340/5.61
6,714,118 B1 * 3/2004 Frolov et al. ................... 340/5.7
6,963,280 B2 * 11/2005 Eskildsen ..................... 340/542
7,113,073 B2 * 9/2006 Taylor et al. ................. 340/5.27
7,548,151 B2 * 6/2009 Roosli et al. ................... 340/5.6
7,782,175 B2 * 8/2010 Stratmann .................... 340/5.61
2003/0074936 A1 * 4/2003 Conforti ......................... 70/277
2003/0096607 A1 * 5/2003 Taylor ........................... 455/425
2003/0214384 A1 * 11/2003 Milo .............................. 340/5.7
2007/0267489 A1 * 11/2007 Borodulin ..................... 235/382

* cited by examiner

*Primary Examiner* — Thien M. Le
*Assistant Examiner* — April Taylor
(74) *Attorney, Agent, or Firm* — Husch Blackwell

(57) ABSTRACT

A door security apparatus including a door strike connected to a structure and electrically connected to a first energy transceiver. The door strike is in spaced mating relationship to a door. A door-locking device is coupled to the door for locking and unlocking the door to the door strike. The door-locking device is electrically connected to a second energy transceiver in spaced mating relationship and electrically communicating with the first energy transceiver. The door-locking device includes an access interface communicating with a microprocessor for receiving an access credential. A controlling device is electrically connected to the first energy transceiver, and the controlling device initiates unlocking and locking the door to the door strike using the door-locking device after evaluating the validity of the access credential received from the access interface.

5 Claims, 2 Drawing Sheets

24
110
Functions:
Rex
Lock/Unlock
100
102
48
108a
20
Comm.
34
50
104a
60
58
MP
R.I.
40
106
54
Power
Door
Strike
30
108b
306
20
To
Controller
120
118a
124
118b
Functions:
Rex
Lock/Unlock
140
138b
104b
144
138a
128a
134
128b
130

INTEGRATED ONLINE DOOR VIA ELECTRONIC DOOR HANDLE

CROSS-REFERENCE TO RELATED APPLICATIONS

This application is a Continuation of and claims the benefit of the filing date of U.S. application Ser. No. 11/782,557 filed Jul. 24, 2007.

FIELD OF THE INVENTION

The present invention relates to a security system and, more specifically, relates to a security system for controlling access at an entry door.

BACKGROUND OF THE INVENTION

Current devices and methods for providing access control at a door typically include online door security systems and offline door security systems. Online doors typically include a reader for accepting an access credential, an electro-mechanical door strike, a door position switch and a request to exit (REX) device to allow free egress. Each of these devices is individually wired to a central controller which authenticates the credential and activates a relay to provide power to the electro mechanical door strike.

Offline doors typically are comprised of a reader built into a portion of a lockset attached to the door. These systems are typically battery powered and utilize data stored on a user's smart card to determine whether to authenticate and unlock the door.

Both of these known methods and devices have drawbacks which include wiring through, for example, a home or office space, to a card reader, door strike, door position switch and egress switch. The expense of the wiring and labor cost can be prohibitive because the devices are labor intensive to install, and all the devices are wired individually. Further the cost of such known systems and devices can be exorbitant because each piece of equipment must be purchased separately. Offline door security systems are battery operated, thus scheduled maintenance and/or replacement of the battery must occur at regular intervals. Further, if a battery fails, the system does not have a back up and shuts down. Additionally, typical offline security systems report security events by writing such events to cards, which is slow and does not provide real time reporting.

Therefore, a need exists for a door security system having less components and which requires less wiring, and thus reduced labor costs. Additionally, it would be desirable for a door security system to provide real time data feedback. Further, it would be desirable for a door security system include less devices for a simpler installation and manufacturing thereby saving manufacturing and installation costs.

SUMMARY OF THE INVENTION

In an aspect of the invention, a door security apparatus includes a door strike connected to a structure and electrically connected to a first energy transceiver. The door strike is in spaced mating relationship to a door. A door locking device is coupled to the door for locking and unlocking the door to the door strike. The door locking device is electrically connected to a second energy transceiver in spaced mating relationship and electrically communicating with the first energy transceiver. A microprocessor is coupled to the door locking device, and the microprocessor is electrically connected to the second energy transceiver. An access interface is communicating with the microprocessor for receiving an access credential. A controlling device is electrically connected to the first energy transceiver. The controlling device initiates unlocking and locking the door to the door strike using the door locking device after evaluating the validity of the access credential received from the access interface.

In a related aspect, the door locking device includes the access interface, and both the access interface and the microprocessor are electrically connected to the second energy transceiver.

In a related aspect, the controlling device sends an electrical signal to the locking device for locking and unlocking the door.

In a related aspect, the microprocessor and the controlling device are communicating data using the first and second energy transceivers.

In a related aspect, the controlling device is electrically connected to the first energy transceiver using a single electrical circuit including two wires.

In a related aspect, the first and second electrical storage devices are first and second inductors.

In a related aspect, the access interface is a radio-frequency identification card reader.

In a related aspect, the controlling device loses communication and power transmission to the door locking device when the door is unlocked and opened and re-establishes communication and power transmission to the door locking device when the door is closed.

In a related aspect, the apparatus further includes a door release egress device on an inside surface of the door and electrically connected to the door locking device.

In a related aspect, the apparatus further includes an electrical circuit connected individually to a plurality of door strikes and door locking devices in series in the electrical circuit and connected to the controlling device.

In a related aspect, the circuit includes a wire connection to the first energy transceiver and a bypass wire bypassing the first of a plurality of door strikes and door locking devices to maintain electrical connectivity with the circuit and to the remaining plurality of door strikes and door locking devices in the circuit.

In a related aspect, the controlling device controls electrically bypassing and connecting the electrical circuit to the first inductors of the door strikes.

In a related aspect, the structure is at least partially defining a secure area and the door is connected to the structure or another structure partially defining the secure area.

In a related aspect, the structure is at least partially defining an enclosed area and the door is connected to the structure or another structure partially defining and enclosing the enclosed area.

In another aspect of the invention, a security system for controlling access to an enclosed area includes a door strike connected to a structure at least partially defining an enclosed area. The door strike is electrically connected to a first energy transceiver, and the door strike is in spaced mating relationship to a door connected to the structure or another structure defining and enclosing the enclosed area. A door locking device coupled to the door for locking and unlocking the door with the door strike, and the door locking device electrically connected to a second energy transceiver in spaced mating relationship and electrically communicating with the first energy transceiver. The door locking device includes an access interface communicating with a microprocessor for receiving an access credential, and both the access interface and the microprocessor are electrically connected to the second energy transceiver. A controlling device is electrically connected to the first energy transceiver. The controlling device initiates unlocking and locking the door to the door strike using the door locking device after evaluating the validity of the access credential received from the access interface for allowing and preventing access to the enclosed area.

In a related aspect, the controlling device loses communication and power transmission to the door locking device when the door is unlocked and opened and re-establishes communication and power transmission to the door locking device when the door is closed.

In a related aspect, the system further includes a door release egress device on an inside surface of the door and electrically connected to the door locking device.

In a related aspect, the system further includes an electrical circuit connected individually to a plurality of door strikes and door locking devices in series in the electrical circuit and connected to the controlling device.

In a related aspect, the controlling device controls electrically bypassing and connecting the electrical circuit to the first inductors of the door strikes.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
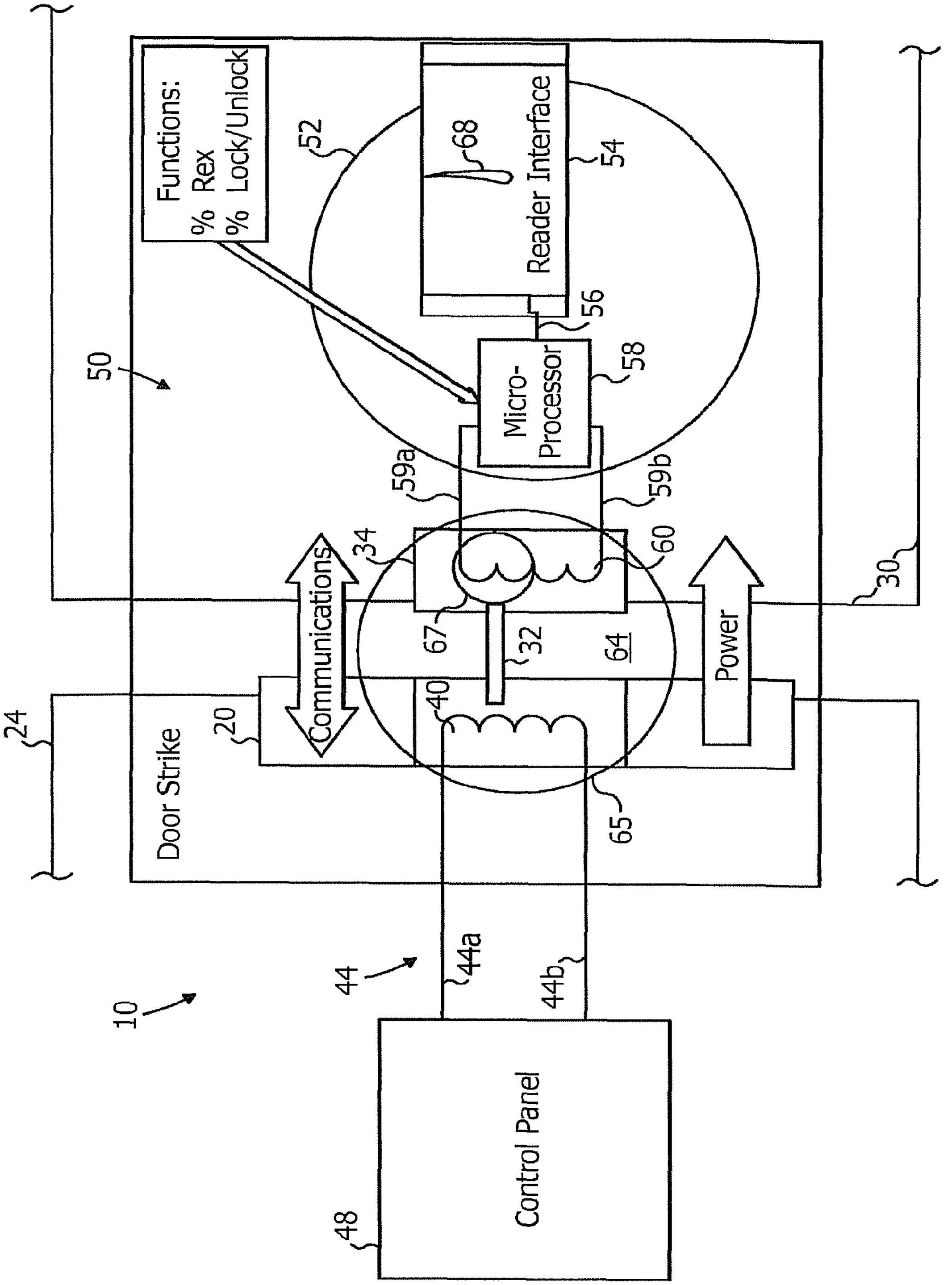
FIG. 1 is a block diagram depicting a door security apparatus and system according to an embodiment of the invention including a controlling device, a door strike, and a door locking device.

Referring to FIG. 1, an illustrative embodiment of a door security apparatus and system 10 according to the present invention for controlling access at an entry door 30 includes a door strike 20 in spaced mating relationship to a door 30. The door strike is connected to a structure 24 which may be, for example, a wall of a room or a security wall blocking access to an enclosed area. The door strike is also connected to a first energy transceiver embodied as a primary inductor 40. An energy transceiver is a device capable of sending and receiving energy, which may be comprised of power and/or communications. The primary inductor 40 is connected to a controlling device 48 via circuit 44 having an output wire 44*a* and return wire 44*b* providing electrical power to the primary inductor 40. Thus, the controlling device 48 provides A/C power and communications over a single pair of wires 44*a* and 44*b*.

An electronic door locking device 50 is attached to the door 30 using a mounting plate 52 and a locking plate 34. The mounting plate 52 of the door locking device 50 includes an access interface for reading credential data embodied as a radio-frequency identification (RFID) card reader 54, and a microprocessor 58 for locking and unlocking the door 30 in relation to the door strike 20 upon command from the controlling device 48. An access interface may also include, for example, an infrared card reader, or a biometric scanner. The microprocessor 58, and the card reader 54 are electrically connected via wire 56 and the microprocessor 58 is electrically connected via wires 59*a*, 59*b* to a second energy transceiver embodied as a secondary inductor 60. Alternatively, the card reader 54 may be remotely located in relation to the microprocessor 58 and electrically connected to the secondary inductor 60 or another power source. The reader 54 and the microprocessor 58 may alternatively be connected wirelessly via antenna 68 embedded in the reader 54 for communicating data to and from the card and microprocessor 58. The second inductor 60 is in spaced mating relationship and electrically communicating with the first inductor 40. The controlling device 48 provides power and communications over the single pair of lines 44*a* and 44*b* to the door locking device 50 using a transformer 65. The transformer 65 includes the primary inductor 40 transferring electrical power across the space 64 to the secondary inductor 60 which supplies electrical power to the microprocessor 58 and the card reader 54. The controlling device 48 also detects when communications are broken to the door locking device 50. The controlling device 48 communicates with the electronic door locking device 50 over the same pair of wires 44*a* and 44*b* by modulating communications information onto the wires using a different frequency than the AC power. At the door 30, the electrical energy containing the power and communications is induced across the airgap 64 between the door strike 20 and the door locking device 50 wherein the secondary inductor 60 receives induced power from the primary inductor 40. Communications over the airgap 64 interface is bi-directional and includes synchronous communications protocols.

Additionally, the door 30 is locked by disabling a handle 67 from turning or engaging an internal mechanism (not shown) to retract a latch 32 connected to a locking plate 34 on the door 30 and engaging the door strike 20. The handle is enabled, for example, by the controlling device 48 sending a signal to the microprocessor 58 to allow engagement of the internal mechanism to retract the latch 32 when the handle 67 is turned, thus disengaging the latch 32 from the door strike 20. The microprocessor 58 communicates with the reader 54 by receiving and reading the bits received from the antenna, the microprocessor may perform any parity/checksum or the like calculations to ensure the read was good (discarding any bits that don't pass), format and send a message to the controlling device 48 containing the bitstream received from the antenna 68.

The system 10 is an online system where every event that occurs can be immediately reported to an operator using a constant connection from the operator to the controlling device 48. In contrast, in an offline system, a controller is coupled with a reader and the controller allows or disallows access. If a door is forced open, or held open too long, or a credential holder is denied access through the door these events are both stored in the controller and written to a users card. Therefore, events stored on the controller are only useful for forensic purposes. The events written to a user's card can be read by an on-line reader, and then forwarded to an operator. The time required for the events to be forwarded to an operator is highly variable and could take anywhere from a few minutes to hours or days or weeks.

In operation, the card reader 54 accepts a credential, in this embodiment a card (not shown) from a user and processes the credential using the microprocessor 58. The card reader 54 responds to a periodic polling message from the controlling device 48 with the credential. The controlling device 48 authenticates the credential. If the credential is valid, the controlling device 48 will send a message to the microprocessor 58 to engage the mechanism in the locking plate 34 to allow the door handle to retract the latch 32 from the door strike 20. When the door 30 is open A/C power transmission ceases to the microprocessor 58 and the card reader 54. Power is resumed to the microprocessor 58 and card reader 54 when the door 30 is closed. Additionally, the door 30 includes an emergency egress device or request to exit (REX) embodied as the handle 67 for exiting through the door 30. In the system 10, the handle 67 also acts as a REX from the unsecured side of the door 30. When a user on the secure side of the door 30 desires to open the door they will turn the handle, the microprocessor 58 will detect that the handle is turned and allow the door to open by the handle 67 retracting the latch 32. The microprocessor 58 communicates the egress to the controlling device 48 without requiring a command from the controlling device to allow the egress to comply with free egress at the secure side of the door 30. Thus, the system 10 does not require a separate REX device, and thereby saves the cost of the extra device, wiring, and installation costs.

Figure 2:
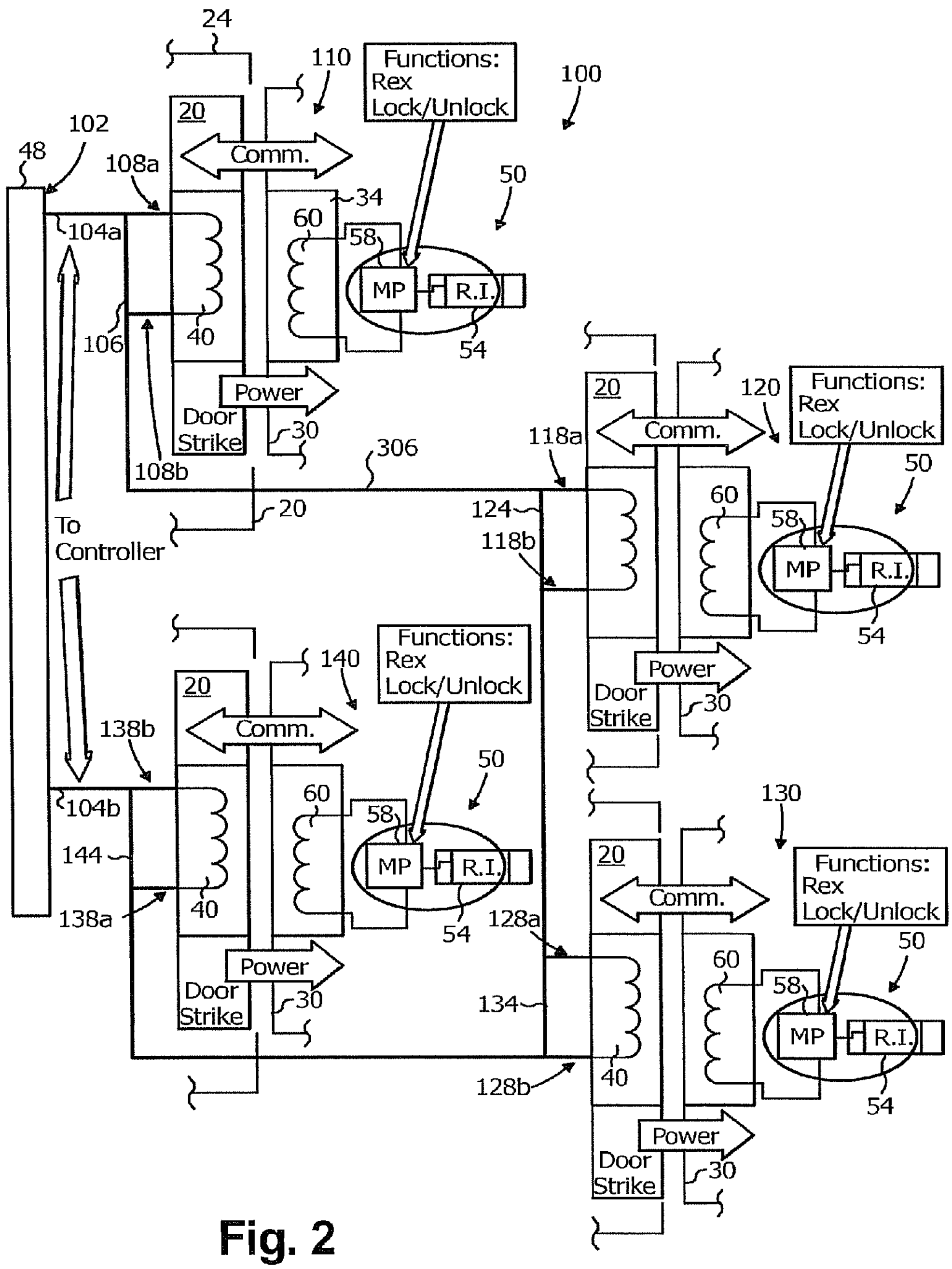
FIG. 2 is a block diagram depicting another embodiment of the door security apparatus and system according to the present invention including a plurality of locations having door strikes and door locking devices similar to the embodiment shown in FIG. 1 connected in series to the controlling device.

Referring to FIG. 2, an illustrative security system 100 for controlling access to a series of security apparatus, which are the same as the security apparatus 10 shown in FIG. 1 and discussed above and therefore include the same reference numerals referring to like elements. However, the security system 100 includes the controlling device 48 connected to a circuit 102 having an output wire 104 from the controlling device 48 powering the first security system 110 via input wire 108*a* with an output wire 108*b* returning to the circuit 102. The controlling device 48 communicates with the electronic door locking devices 50 using the circuit 102 providing power as in the singular door example shown in FIG. 1, by modulating communications information onto the wires using a different frequency than A/C power. A bypass wire 106 is continuous with the controlling device 48 output 104*a* and bypasses the first security system 110 when not providing power to the first security system 110, i.e., when the door 30 is open. The bypass wire 106 connects to a power input 118*a* of a second security system 120 having an output 118*b* returning to the circuit 102. Similarly, a bypass wire 124 bypasses the second security system 120 when not providing power to the second security system 120. A power input wire 128*a* powers a third security system 130 having an output 128*b* returning to the circuit 102. A bypass line 134 bypasses the third security system 130 when not providing power to the third security system 130. Further, a power input 138*a* powers a fourth security system 140 having an output 138*b* returning to the circuit 102. A bypass line 144 bypasses the fourth security system 140 when not providing power to the fourth security system 140 and connects with wire 104*b* returning to the controlling device 48 and completing the circuit 102. Thus, power is maintained to the security systems 110-140 on the circuit 102 when their respective doors 30 are closed and one of the security systems 110-140 has a door 30 open.

Referring to FIGS. 1 and 2, an advantage of the present invention includes the circuits 44 and 102 only requiring two wires connecting to the door strike and power being transferred via the primary and secondary inductors 40, 60, as opposed to individual wiring connecting the reader 54, microprocessor 58 and locking plate 34 to the controlling device 48. Further, the electronic door locking device 50 may, for example, be manufactured by multi-dropping which makes wiring a door less expensive and saves labor time because each subsystem, i.e., reader, door position switch, door strike, REX device, does not need to have wires run back to the controller.

Further, the security system 10 can communicate events including, for example, access identification and frequency of entry, and report the events in real-time to the controlling device 48. A loss of communications from the controlling device 48 to the electronic door locking device 50 indicates the door is open. Thus, the controlling device 48 also acts as a door position switch by detecting when communications are broken to door locking device 50.

In operation, referring to FIGS. 1 and 2, upon presentation of a card to the RFID reader 54, the electronic door locking device responds to a polling message from the controlling device 48 with the credential data from the card. The controlling device 48 authenticates the credential. If the credential is valid, access is allowed through the door 30, and the controlling device 48 will send a message to the microprocessor 58 to permit the electronic door locking device 50 to allow the latch 32 to disengage the door strike when the handle 67 is turned. Unlocking devices may include, for example, engaging a magnet which will allow a bolt to retract inside the door handle allowing the door handle to operate or turn. The user may also receive a visual indication, for example, an LED turning green indicating that they are now allowed to use the door. When the door is open, the electronic door locking device 50 loses power and communication with the controlling device 48. The controller's continued polling of the door will be met without response indicating to the controller that the door is now open.

If a received credential is not authenticated as a valid credential by the controlling device 48, permission to access the door will not be granted by the controlling device. Instead, the controlling device 48 will send an access denied message to the electronic door locking device 50. The electronic door locking device may provide indication of denied access by, for example, turning an LED red.

In the case of egress through the door 30 from the secure side of the door 30, when the handle 67 on the secure side of the door 30 is turned, a message is sent to the microprocessor 58 to permit the locking mechanism to allow the latch 32 to retract from the door strike 20 allowing the door 30 to open. A communication with the controlling device 48 indicates a request to egress. The exit handle will always open the door with or without the assistance of power. If the door is forced open from the secure side, the controlling device 48 will detect the loss of communications without having received either a credential or egress request message. Thus, the controlling device 48 will register a forced door alarm condition.

In another embodiment of the invention, the door 30 is in public access mode which is where users need not present a credential to ingress. The controlling device 48 sends a public access message to the microprocessor 58 of the electronic door locking device 50 for the mechanism in the locking plate 34 to allow the handle to operate thus retracting the latch at will, i.e., open freely. The electronic door locking device 50 will remain in this mode until it receives a message from the controlling device 48 that public access is over.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A door security apparatus comprising:

a door mountable variable voltage energy transceiver;

control circuits coupled to the energy transceiver; and an access interface input line communicating with the control circuits, the control circuits couple indicia relative to an access credential to the door mountable transceiver, wherein the door mountable variable voltage energy transceiver receives induced power from a second displaced transceiver, and wherein the door mountable variable voltage energy transceiver transmits and receives communications information to and from the second displaced transceiver, wherein the door mountable variable voltage energy transceiver receives induced power from the second transceiver, and wherein the door mountable variable voltage energy transceiver transmits and receives communications information to and from the second transceiver when the transceivers exhibit a selected relationship to one another; and including circuitry to bypass the second transceiver when the two transceivers do not exhibit the selected relationship.

2. A security system comprising:

a door locking device for locking and unlocking a door;

a door mounting element;

control circuits carried by the door mounting element;

a door inductor proximate the control circuits and coupled thereto; and first and second inputs coupled to the control circuits where the first input couples access information to the control circuits, and the second input couples request to exit information to the control circuits, wherein the door inductor receives power from a second displaced inductor and wherein the door inductor transmits and receives communications information to and from the second displaced inductor and which includes circuitry, coupled to the second inductor, to bypass that inductor when the two inductors exhibit a pre-determined relationship to one another.

3. A door locking device for locking and unlocking a door, the device comprising:

control circuits coupled to a door inductor proximate the control circuits;

first and second inputs coupled to the control circuits where one input couples access information to the control circuits, and another couples request to exit information to the control circuits; and a frame inductor where the frame inductor has first and second input/output ports configured to receive electrical energy from a displaced source and to transmit information from at least one of the ports and where the frame inductor, at least intermittently, couples electrical energy containing both power and communications information to the door inductor, wherein the door inductor energizes the control circuits which includes circuitry, coupled to the frame inductor, to bypass that inductor when the two inductors exhibit a pre-determined relationship to one another.

4. A device as in claim 3 which includes a plurality of frame inductors where each inductor includes circuitry, coupled thereto to selectively bypass that inductor.

5. A door control apparatus comprising:

a door mountable variable voltage energy transceiver;

a door locking device including control circuits coupled to the energy transceiver;

wherein the door mountable variable voltage energy transceiver receives induced power from a second displaced transceiver, to energize the door locking device only when in a first position relative to the second displaced transceiver, and wherein the door mountable variable voltage energy transceiver transmits and receives communications information to and from the second displaced transceiver only when the door locking device is energized and which includes a credential reading device, coupled to the control circuits with circuitry, coupled to the second displaced transceiver, to bypass the second displaced transceiver when the two transceivers exhibit a pre-determined relationship to one another.

* * * * *